No. 783,347. PATENTED FEB. 21, 1905.
R. L. WOODRUFF.
PLANTER AND FERTILIZER DISTRIBUTER.
APPLICATION FILED NOV. 29, 1904.

2 SHEETS—SHEET 1.

Witnesses
Chas. K. Davis.
M. E. Moore.

Inventor
Robert L. Woodruff
by Wm. N. Moore
Attorney

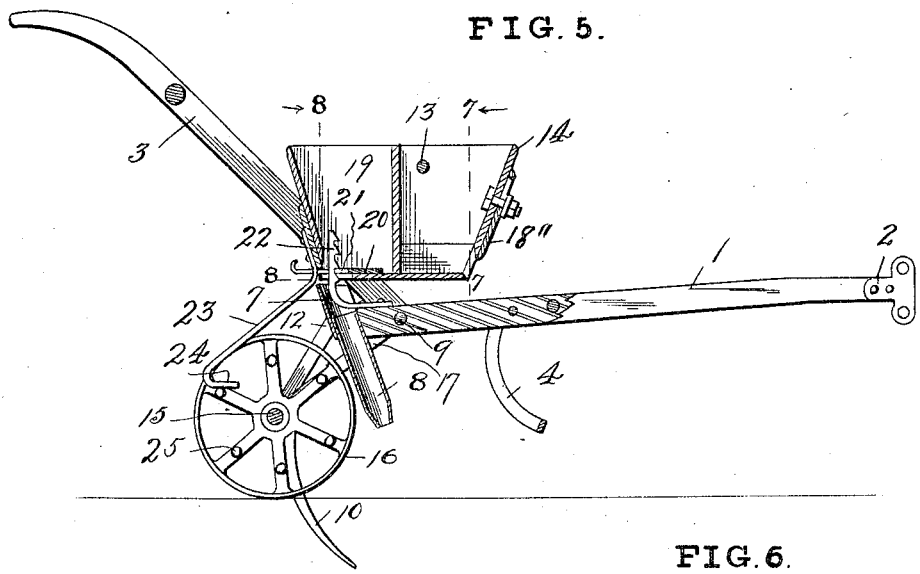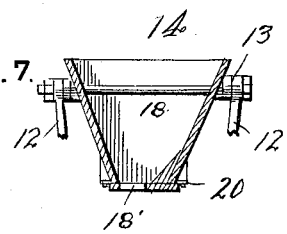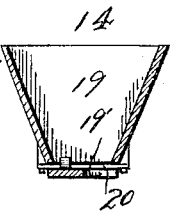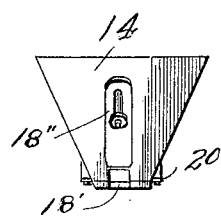

No. 783,347.

Patented February 21, 1905.

UNITED STATES PATENT OFFICE.

ROBERT LEE WOODRUFF, OF WINDER, GEORGIA, ASSIGNOR TO WOODRUFF HARDWARE CO., OF WINDER, GEORGIA.

PLANTER AND FERTILIZER-DISTRIBUTER.

SPECIFICATION forming part of Letters Patent No. 783,347, dated February 21, 1905.

Application filed November 29, 1904. Serial No. 234,709.

*To all whom it may concern:*

Be it known that I, ROBERT LEE WOODRUFF, a citizen of the United States, residing at Winder, in the county of Jackson and State of Georgia, have invented certain new and useful Improvements in Planters and Fertilizer-Distributers, of which the following is a specification.

My invention relates to improvements in combined planters and fertilizer-distributers, and refers particularly to a planter for use in planting cotton-seed, although it may be used for any purpose where a combined planter and fertilizer-distributer would be desired.

The main object of my invention is the provision of a planter and fertilizer-distributer which will make the furrow, drop the seed, distribute the fertilizer, and cover the furrow all in an efficient and thorough manner and which implement will be the embodiment of simplicity, durability, and inexpensiveness and thoroughly practical in every particular.

To attain the desired objects the invention consists of a combined planter and fertilizer-distributer embodying novel features of construction and combination of parts, substantially as disclosed herein.

Figure 1:
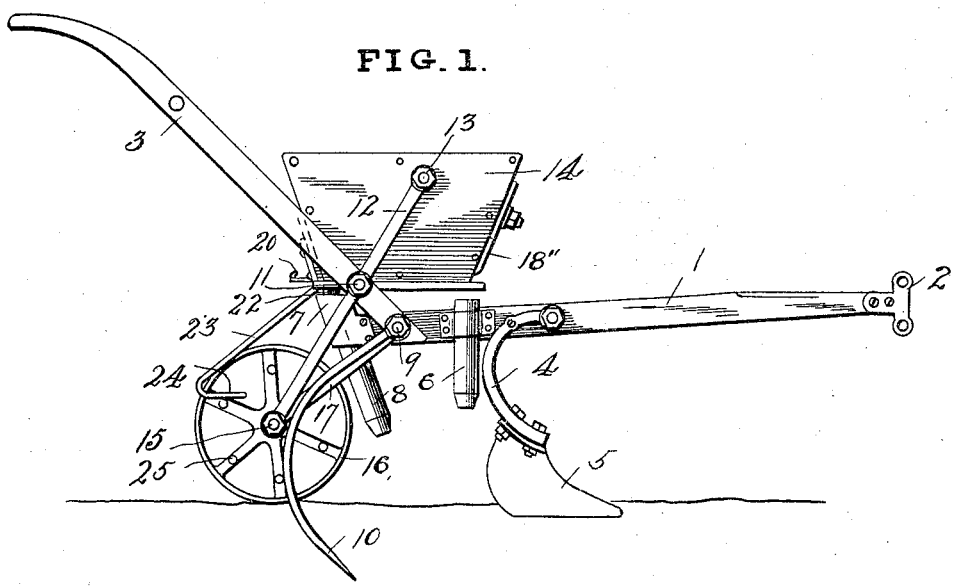
Figure 2:
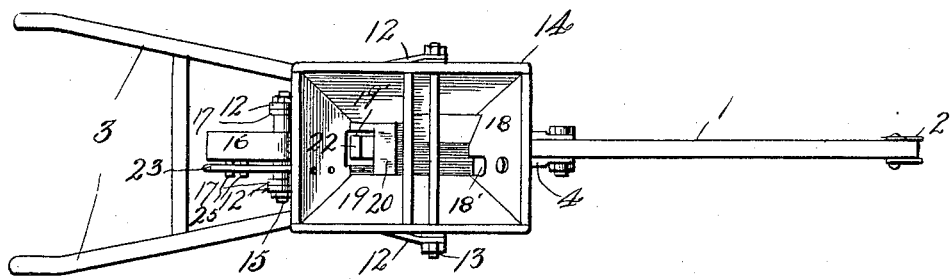
Figure 3:
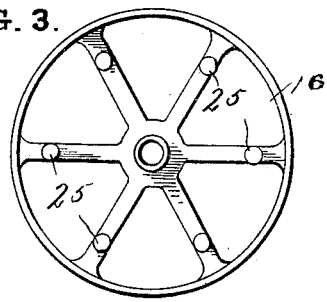
Figure 4:
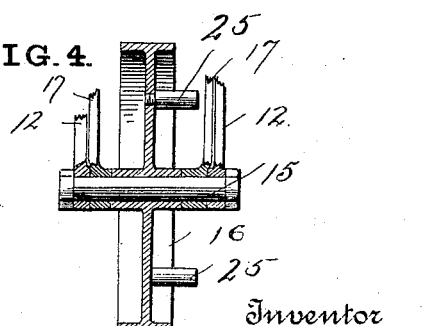

Figure 1 represents a side elevation of the complete implement. Fig. 2 represents a top plan view thereof. Figs. 3 and 4 represent detail views of the ground and tappet wheel. Fig. 5 represents a vertical central longitudinal sectional view of the complete implement. Fig. 6 is a detail view of the adjusting-plate for the seed-hopper. Fig. 7 represents a detail sectional view on line 7 7 of Fig. 5. Fig. 8 represents a detail sectional view on the line 8 8 of Fig. 5, and Fig. 9 represents an elevation of the hopper looking at the forward end thereof.

Referring by numerals to the drawings, in which similar reference-numerals denote corresponding parts in the several views of the drawings, the numeral 1 designates the tongue or beam, having at its forward end the draft devices or clevis 2 and at its rear portion has connected the pair of handles 3. Upon the beam is secured the curved standard 4, to which is adjustably connected the furrow-opener 5, in the rear of which upon the beam is placed the fertilizer-feeding spout 6, and at the extreme rear end of said beam is placed the feed or guide chute 7. The seed-distributing spout 8 projects into this chute and is arranged at an incline, and the fertilizer-feeding spout is arranged vertically directly in front of the seed-spout and in line therewith, whereby the fertilizer falls in the rear near the plow, and loose dirt dropping from the plow forms a layer over the fertilizer thus falling to the ground. Then the seeds fall from the rear spout on this loose dirt and are covered by the coverers, as will be described. Thus the fertilizer is placed below the seed, and the intervening loose dirt prevents the seed from being destroyed by the fertilizer if the latter is too strong.

Passing through the beam is the rod 9, upon which the upper end of the coverers 10 are secured. To the handles are secured at 11, intermediate of their ends, the inclined side bars 12, the upper ends of which are connected pivotally at 13 to the hopper 14, and the lower ends are connected to the axle 15, upon which is mounted the supporting-wheel 16, and leading from the axle to the handles and frame are the short braces or bars 17, this structure providing a strong but light framework.

The hopper is divided into a fertilizer-compartment 18, having a feed-opening 18', which allows the fertilizer to fall directly into the spout, and a regulating device 18" is provided for regulating the feed of the fertilizer from the hopper. The other compartment, 19, of the hopper receives the seed and is provided with an opening 19', which discharges the seed through the opening into the spout. The seed-distributing compartment is provided with the sliding plate 20, having an opening 21, and this plate serves to adjust or regulate the amount of seed fed to the spout. This plate is also adapted to engage the rack-bar 22, which is secured to the beam and has its teeth adapted to engage the plate when the hopper is tilted through the medium of the arm 23, connected to the rear of the hopper. Arm 23 has a hooked end 24 for engaging the pins or studs 25 upon the ground-wheel. Said pins are brought at regular intervals into engagement with the hooked end of the arm to tilt the hopper and cause the fertilizer and seed to be fed into their respective spouts in a thorough and efficient manner.

From the foregoing description, taken in connection with the drawings, the operation of the combined fertilizer and planter will be readily understood, and I would simply state that the implement is drawn over the ground and the furrow made by the plow, the fertilizer is fed through its spout to the rear of the plow, dirt falls from the plow to cover the fertilizer, the seed is supplied through the seed-feed spout, and then the coverers throw the dirt over the seed, and the ground-wheel, following in the same line with the two feed-spouts, tamps or presses down the dirt upon the seed and fertilizer, thus completing the entire operation of distributing the fertilizer, planting the seed, and covering the furrow in an efficient, rapid, and practical manner.

I claim—

1. A combined planter and fertilizer-distributer, consisting of a beam and handle, a fertilizer and seed spout mounted in the beam, a pivoted hopper having a fertilizer and seed compartment, and devices for tilting the hopper to discharge the fertilizer and seed regularly into their respective spouts.

2. A combined planter and fertilizer-distributer, consisting of a beam and handle, a frame connected to the handles and beam, a ground-wheel mounted in the frame, a hopper pivotally mounted in the frame, and having a seed and fertilizer compartment, feed-spouts for said compartment, and devices connected to the hopper and operated by the ground-wheel for feeding the seed and fertilizer to their respective spouts.

3. A combined planter and fertilizer-distributer consisting of a beam and handle, fertilizer and seed spouts mounted in the beam, a furrow-opener carried by the beam, coverers on each side of the beam, a ground-wheel having pins or studs, a pivoted hopper, fertilizer and seed regulating devices in said hopper, spouts for the seed and fertilizer, and means connected with the hopper and engaged by the pins on the ground-wheel for tilting the hopper to feed the fertilizer and seed.

4. A combined planter and fertilizer-distributer, consisting of a hopper having a seed and fertilizer compartment and provided each with a discharge-opening, a feed-regulating device in the seed and fertilizer compartment, a ground-wheel formed with tappets or pins, an arm leading from the hopper and adapted to be engaged by said tappets or pins for tilting the hopper to feed the fertilizer and seed, and devices for limiting the movement or tilt of said hopper.

5. A combined planter and fertilizer-distributer, consisting of the handles and beam, the side bars connected to the handles, the hopper pivoted to the upper end of the side bars and having a seed and fertilizer compartment, the ground-wheel having its axle journaled in the lower end of said side bars, and the arm connected to the hopper and operated upon by the ground-wheel for tilting the hopper.

6. A combined planter and fertilizer-distributer, consisting of the handles and beam, the side bars connected to the handles, the hopper pivoted to the upper end of the side bars and having a seed and fertilizer compartment, the ground-wheel having pins or studs and having its axle journaled in the lower end of the side bars, the arm connected to the hopper and operated upon by the pins or studs for tilting the hopper, the seed-regulating device, the fertilizer-feed-regulating device, and the rack-bar for engaging the seed-feed-regulating device to adjust the tilt or movement of the hopper, and regulate the supply of fertilizer.

7. A combined planter and fertilizer-distributer consisting of the handles and beam, the furrow-opener secured to the beam, the seed and fertilizer spouts in rear of the furrow-opener, the guide-chute for the seed-spout, the pivoted hopper having the seed and fertilizer compartments, the seed and fertilizer feed regulating devices, the rack-bar for limiting the tilt of the hopper, the ground-wheel having the pins or studs, the arm connected to the hopper and adapted to be engaged by the studs or pins, and the coverers on each side of the beams.

8. In a planter and fertilizer-distributer, the combination of the beam, the pair of delivery-spouts, the handles, the pair of links connected to said handles, the wheel having its axle mounted in the lower ends of said links, the pins on the wheel, the hopper pivoted to the upper ends of said links and having a seed and fertilizer compartment, feed-regulating devices for each compartment, and an arm connected at its upper end to the hopper and having its lower end adapted to be engaged by the pins on the wheel to tip the hopper and feed the seed and fertilizer.

In testimony whereof I affix my signature in presence of two witnesses.

ROBERT LEE WOODRUFF.

Witnesses:
A. C. PERRY,
R. U. WRIGHT.